(12) United States Patent
Miller

(10) Patent No.: US 10,687,651 B2
(45) Date of Patent: Jun. 23, 2020

(54) ELECTRIC DISPENSING KETTLE SYSTEM

(71) Applicant: Jake Miller, San Francisco, CA (US)

(72) Inventor: Jake Miller, San Francisco, CA (US)

(73) Assignee: Fellow Industries Inc., San Francisco, CA (US)

(*) Notice: Subject to any disclaimer, the term of this patent is extended or adjusted under 35 U.S.C. 154(b) by 283 days.

(21) Appl. No.: 15/732,646

(22) Filed: Dec. 7, 2017

(65) Prior Publication Data
US 2018/0160847 A1 Jun. 14, 2018

Related U.S. Application Data

(60) Provisional application No. 62/497,942, filed on Dec. 8, 2016.

(51) Int. Cl.
| | | |
|---|---|---|
| *G05D 23/19* | (2006.01) | |
| *G05D 23/22* | (2006.01) | |
| *A47J 31/44* | (2006.01) | |
| *A47J 27/21* | (2006.01) | |

(52) U.S. Cl.
CPC ......... *A47J 27/21* (2013.01); *A47J 27/21091* (2013.01); *A47J 31/4403* (2013.01); *G05D 23/1919* (2013.01); *G05D 23/22* (2013.01); *A47J 27/21008* (2013.01)

(58) Field of Classification Search
USPC .......... 99/295; 219/435–438, 444, 449, 429, 219/432; 392/444, 474, 475, 465, 498
See application file for complete search history.

(56) References Cited

U.S. PATENT DOCUMENTS

| | | | | |
|---|---|---|---|---|
| 5,842,353 A | * | 12/1998 | Kuo-Liang | ........ A47G 19/2288 62/190 |
| 6,560,806 B1 | * | 5/2003 | Lawson | ................... A47L 9/244 8/158 |
| 2010/0270284 A1 | * | 10/2010 | Cohen | ................. A47J 27/21175 219/429 |
| 2014/0263270 A1 | * | 9/2014 | Garvey | ............... A47J 27/2105 219/441 |
| 2016/0374500 A1 | * | 12/2016 | Bugatti | .............. A47J 27/21141 219/435 |

* cited by examiner

*Primary Examiner* — David J Walczak
(74) *Attorney, Agent, or Firm* — James A. Gavney, Jr.; JAG Patent Services

(57) ABSTRACT

An electric dispensing kettle system with a dispensing kettle seats on to and docks to a control station. The dispensing kettle includes a weighted handle for controlled or balanced pouring. The control station provides controlled power to a heating element within the dispensing kettle with the dispensing kettle seated on to docked to the control station. The control sation includes a PID controller or control loop feedback circuit that continuously modulates power to the heating element based on actual temperature reading received from a thermocouple structure. The control station also includes an electronic dispaly that simultaneously displays an actual temperature of the steeping liquid and the target temperature of the steeping liquid within the dispensing kettle.

13 Claims, 4 Drawing Sheets

ELECTRIC DISPENSING KETTLE SYSTEM

RELATED APPLICATION

This application claims priority under 35 U.S.C. § 119(e) from the U.S. provisional patent application Ser. No. 62/497,942, filed on Dec. 8, 2016, and titled "ELECTRIC DISPENSING KETTLE SYSTEM." The provisional patent application Ser. No. 62/497,942, filed on Dec. 8, 2016, and titled "ELECTRIC DISPENSING KETTLE SYSTEM" is hereby incorporated by reference.

FIELD OF THE INVENTION

This invention generally relates to an electric dispensing kettle system for preparing and dispensing hot beverages, such as coffee and/or tea. In particular, this invention relates to a electric dispensing kettle system with kettle having balanced pouring that is staged on an electric control station.

BACKGROUND OF THE INVENTION

Many different methods for brewing coffee or steeping tea have emerged over time. Coffee is brewed by percolation, by infusion with water under pressure and by other methods. In one such method, coffee grounds or tea leaves, as an infusible material are brought into contact with a large body of heated water for a predetermined time to effect the brewing or steeping of a beverage. After the infusible material is removed, the beverage is ready to be poured from a pot.

Over time certain criteria have been recognized as critical to brewing hot beverages, such as coffee and tea, successfully. Some of these criteria are outside the control of the manufacturers that offer for sell a beverage brewing apparatus. For example, tea drinkers control the quality and quantity of the water and tea leaves used to brew the beverage. Consumers control limited criteria with respect to coffee in terms of a coffee brand selection, the fineness of the resulting coffee grounds and the ratio of water and coffee grounds during brewing.

Additionally, the beverage brewing apparatus may control other important criteria for successfully brewing a hot beverage. For example, the apparatus may control steeping or brewing, temperature and time.

Many prior art step and/or brewing apparatus can be difficult to control while pour and do not provide a user an indication or control over the temperature of the steeping or brewing liquid.

SUMMARY OF INVENTION

The present invention is directed to an electric dispensing kettle system with a dispensing kettle and a control station. The dispensing kettle has with a body, a handle, a pouring spout and an coupling structure on a bottom surface. The electric dispensing kettle system also includes an electric control station, hereafter control station, with a matched coupling member that electrically couples to a heating element within the body of the dispensing kettle through the coupling member when the kettle is seated or staged on the electric control station. The control station provides controlled power to the heating element to heat a steeping liquid with the body of the dispensing kettle.

The control station preferably includes a PID controller or control loop feedback circuit that continuously modulates power to the heating element based on actual temperature readings received from a thermocouple structure in electrical communication with the PID controller or control loop feedback circuit through the coupling structure of the bottom surface of the dispensing kettle and the matched coupling member on the control station.

In operation, a selected or target temperature is set from the control station using a temperature dial knob. The control station heats the heating element until the steeping liquid within the body of the dispensing kettle reaches the selected or target temperature. While heating the steeping liquid, an electronic display on the control station simultaneously displays the actual temperature of the steeping liquid within the body of the dispensing kettle and the selected or target temperature of the steeping liquid.

The dispensing kettle preferably includes a counter-balance weight within the handle of the dispensing kettle. The counter-weight within the handle of the dispensing kettle weighs 25% or more of the total weight of the dispensing kettle and allows for control pouring of the steeping liquid from the body of the dispensing kettle through the pouring spout.

DETAILED DESCRIPTION OF THE INVENTION

Figure 1:
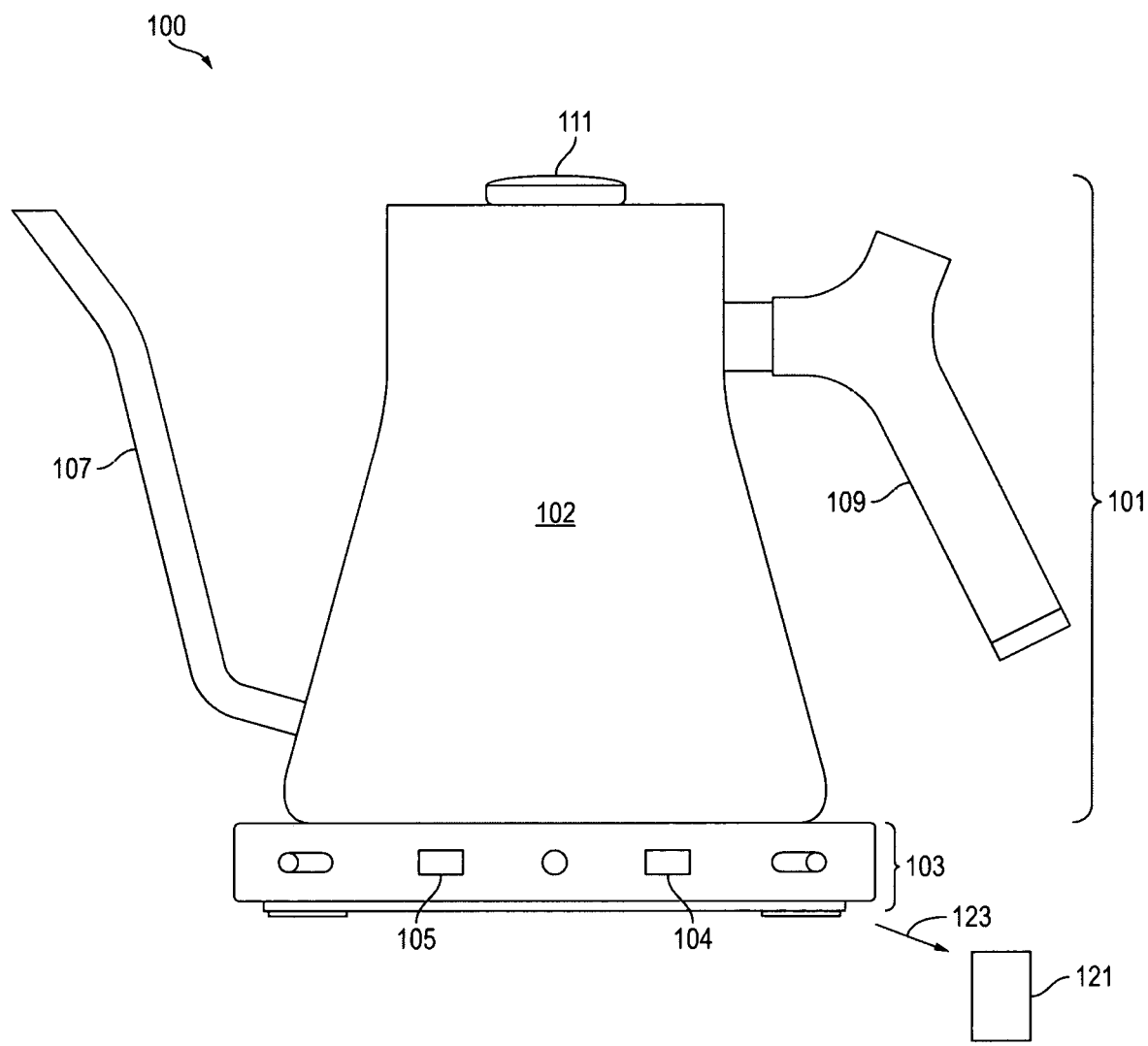
FIG. 1 shows an electric dispensing kettle system, in accordance with the present invention.

FIG. 1 shows an electric dispensing kettle system 100, hereafter dispensing system, for heating a steeping liquid. The dispensing system 100 includes a dispensing kettle 101 and an electric control station 103, hereafter control station.

Figure 4A:
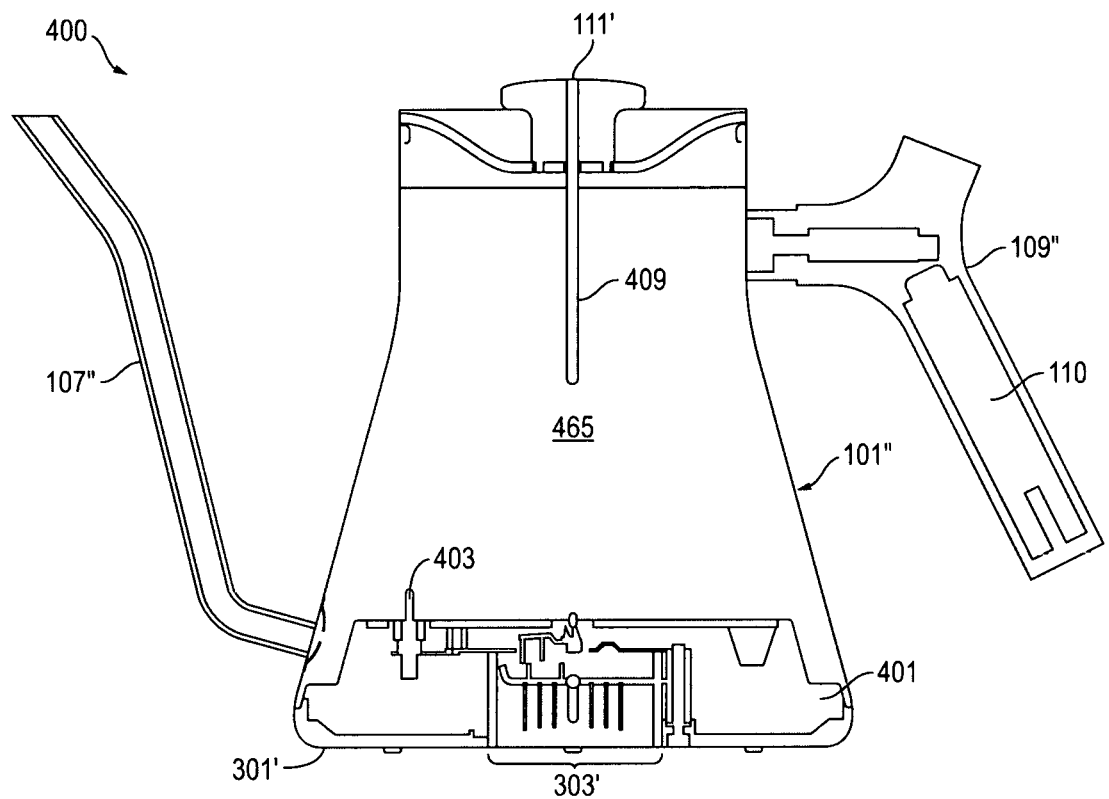
FIGS. 4A-B show cross-sectional views of a dispensing kettle with a heating element, coupling member and thermocouple structure used in the electric dispensing kettle system, in accordance with the present invention.

The dispensing kettle 101 includes a handle 109, a pouring spout 107 and a body 102 for holding the steeping liquid therein. The dispensing kettle 101 can also include a removable top 111, with or with or without a thermometer 409 (FIG. 4A). Within the dispensing kettle 101 there is a heating element 401 (FIG. 4A) that electrically couples to the control station 103 that provides power for heating the steeping liquid within the body 102 of the dispensing kettle 101.

The control station 103 or 103' (FIG. 2A) includes a number of features including all of the controls and all the necessary electronics to heat the steeping liquid within the body 102 of the dispensing kettle 101 or 101' (FIG. 3) while the dispensing kettle 101 or 101' is electrically coupled and docked to the control station 103 or 103'. For example, the control station 103 or 103' includes a power chord 219 (FIG. 2B) that powers the control station 103 or 103', which provides controlled power to the heating element 401 (FIG.

Figure 2B:
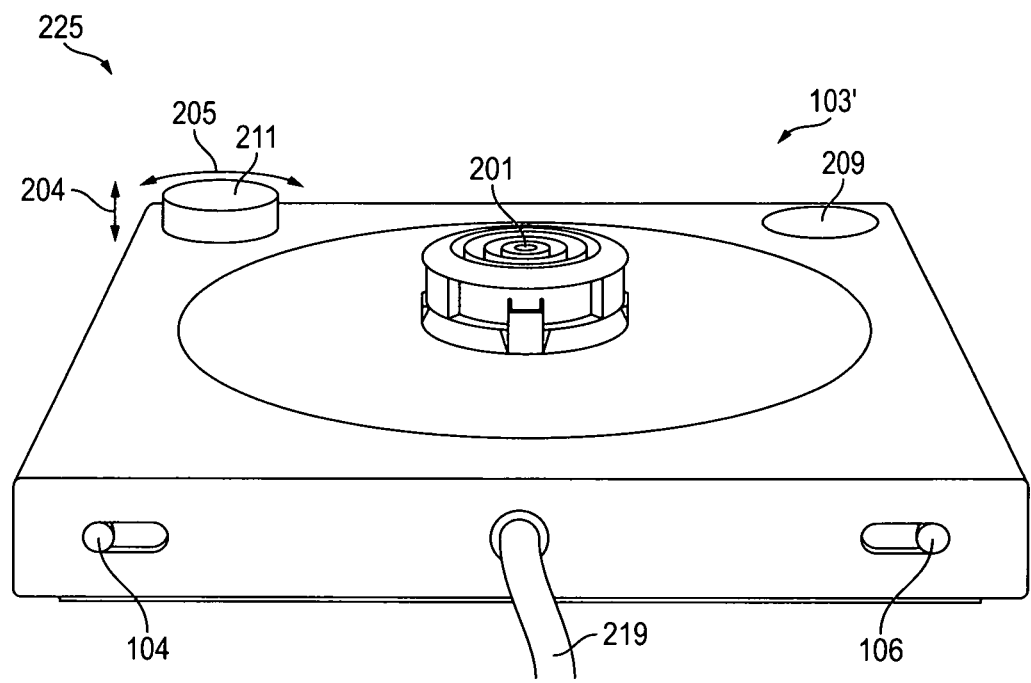
Figure 3:
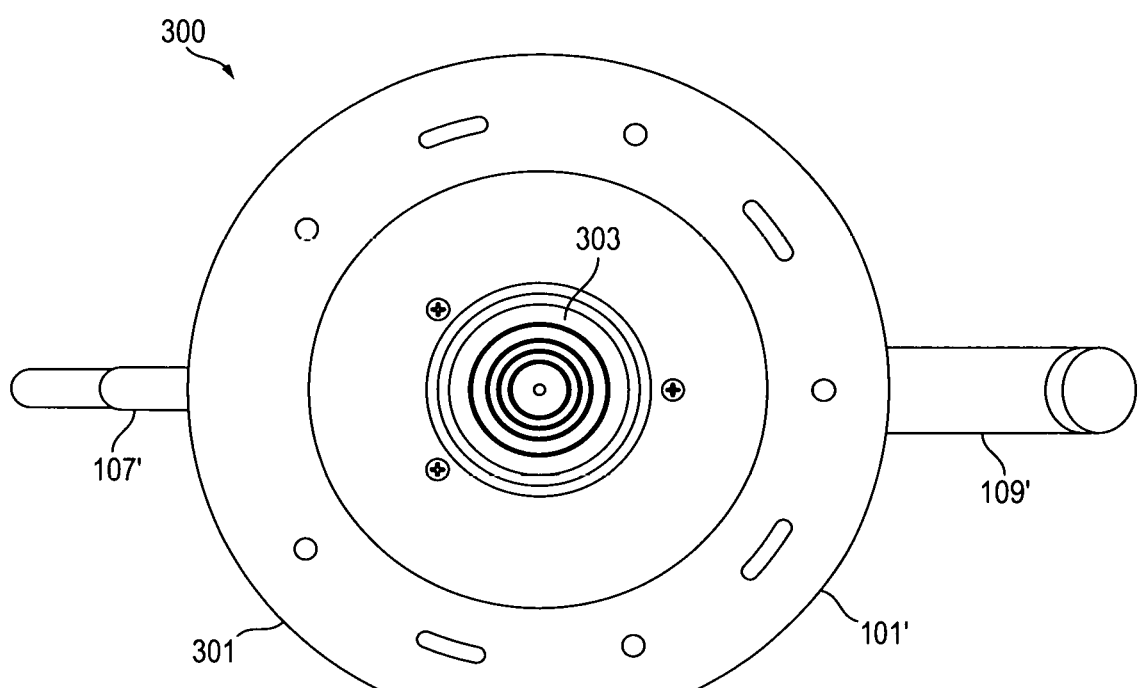
FIG. 3 illustrates a bottom view of a dispensing kettle with a coupling member for electrically connecting the dispensing kettle to an electric control station, in accordance with the present invention.

4A) within the dispensing kettle 101 through coupling features 201 (FIG. 2B) and 303 (FIG. 3). The heating element 401 includes a thermocouple structure 403 (FIG. 4A) that detects the actual temperature of the steeping liquid within the body 102 of the dispensing kettle 101 or 101'. The thermocouple structure 403 is in electrical communication with a PID controller or control loop feedback loop circuit 105 contained within the control station 103 or 103', when the dispensing kettle 101 or 101' is seated or docked onto the control station 103 or 103' through the coupling features 201 and 303. The PID controller or control loop feedback loop 105 continuously modulates power to the heating element 401 to cause the heating element 401 to heat the steeping liquid within the body 102 of the dispensing kettle 101 or 101' to reach and/or maintain a selected temperature or target temperature. The control station 103 or 103' can also include a blue-tooth transmitter or other radio transmitter 104 for transmitting steeping time, heating time, pour-over time, and steeping liquid temperature (hereafter data) in real time, as indicated by the arrow 123, to a computer or smart phone 121. The computer or smart phone 121 can include software or firm-ware to generate a graphical representation of the data transmitted from the control station 103 or 103' to the computer or smart phone 121. Providing controlled power to the heating element 401 to heat the steeping liquid within the body 102 of the dispensing kettle 101 or 101' means not only is the power provided to the heating elements 401 for the steeping liquid to reach and/or maintain a selected temperature or target temperature, but also that the rate that power provided to the heating element 401 is controlled, such that the time it takes for the steeping liquid to reach and/or maintain a selected temperature or target temperature is also controlled.

Figure 2A:
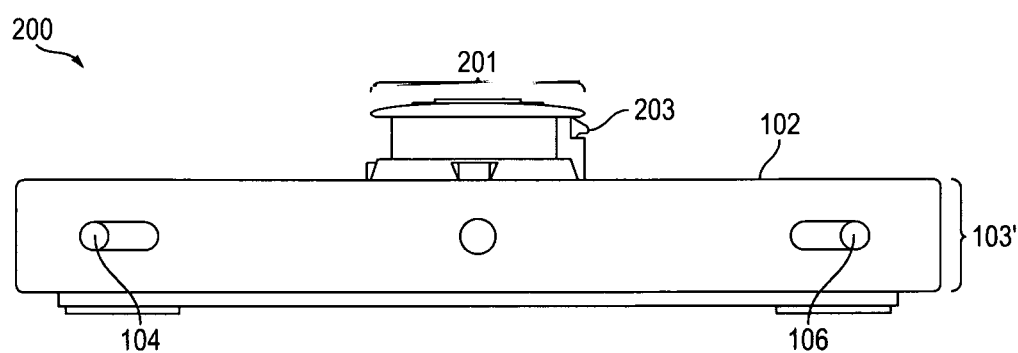
FIGS. 2A-B show views of an electric control station used in the electric dispensing kettle system, in accordance with the present invention.

FIG. 2A shows a side view 200 of a control station 103', in accordance with the embodiments of the invention. The control station 103' includes a temperature unit switch 106 that allows a user to toggle between temperature units of Fahrenheit and Celsius that are displayed and selected from the control station 103'. The control station 103' also includes a hold-timer switch 104. The hold-timer switch 104 is switched to "hold" to allow the control station to maintain power to the heating element 401 (FIG. 4A) and continuous maintain a selected temperature or target temperature of the steeping liquid within the body 102 of the dispensing kettle 101 or 101' when the dispensing kettle 101 (FIG. 1) or 101' (FIG. 3) is seated or docked on the control station 103 (FIG. 1) or 103'. Alternatively, the hold-timer switch 104 is moved or toggled to an off position and the control station will automatically shut off power to the heater element 401 after a duration of time (such as 60 second) and after the steeping liquid within the body 102 of the dispensing kettle 101 or 101' has reached the selected temperature or target temperature.

The heating station 103' also includes a male coupling member 201 that couples to a matched or female coupling member 303 on a bottom surface 301 of the dispensing kettle (FIG. 3). The male coupling member 201 and the matched or female coupling member 303 provide the electrical connection between the heating element 401 to the control station 103' when the steeping kettle 101 or 101' is seated or docked onto the control station 103'. The male coupling member 201 on the control station 103' also includes a sensor switch 203 that automatically shuts off power from the control station 103' to the male coupling member 201 when the dispensing kettle 101 or 101' is removed from or un-docked from the control station 103'.

FIG. 2B shows a perspective view 225 of the heating station 103'. As described above the control station 103' includes a power chord 219 for providing power to the control station 103' through, for example, and electrical outlet (not shown). The control station 103' also includes a temperature unit switch 106 and a hold-timer switch 104, such as described above. The heating station 103' also include and electronic display 209, such as an LCD display. The electronic display 209 preferably simultaneously displays both the actual temperature of the steeping liquid within the body 102 of the dispensing kettle 101 or 101' and a selected temperature or target temperature of the steeping liquid. In operation the selected temperature or target temperature of the steeping liquid within the body 102 of the dispensing kettle 101 or 101' is adjusted by turning the temperature dial knob 211, as indicated by the arrow 205. The selected temperature or target temperature the steeping liquid displayed on the electronic display 209 will then change accordingly. Further, as the temperature of the steeping liquid within the body 102 of the dispensing kettle 101 or 101' changes, the actual temperature displayed on the electronic display 209 will also change accordingly.

After the steeping liquid has reached the target temperature, a user can depress the temperature dial knob 211, as indicate by the arrow 204, and the electronic display 209 will set and display a timer to indicate a passage of time. The passage of time indicated on the electronic display 209 can then be used to monitor steeping times and/or pour over times that are used to make a beverage.

The electric dispensing kettle system 100 can be used in combination with a pour-over steeping and dispensing system that can include, for example, a pour over filter unit, or other filtration device and capturing vessel. Additional details of a beverage steeping and dispensing system are described in patent application Ser. No. 15/544,131 and titled "BEVERAGE STEEPING AND DISPENSING SYSTEM", the contents of which are hereby incorporated by reference in its entirety.

FIG. 3 shows a bottom view 300 of a dispensing kettle 101' or 101. The dispensing kettle 101' has a handle 109', a pouring spout 107', such the handle 109, poring spout 107 and a body 102 from holding the steeping liquid therein, such as described above with reference to FIG. 1. The bottom surface 301 of the dispensing kettle 101' includes a female coupling structure 303 that is in electrical communication with the heating element 401 (FIG. 4A) within the body 102 of the dispensing kettle 101' or 101". In operation, the female coupling structure 303 is seated on or docked with the male coupling structure 201 of the control station 103', and control station provides controlled power to the heating element 401 through electrical connections between the female coupling structure 303 and the male coupling structure 201.

Figure 4B:
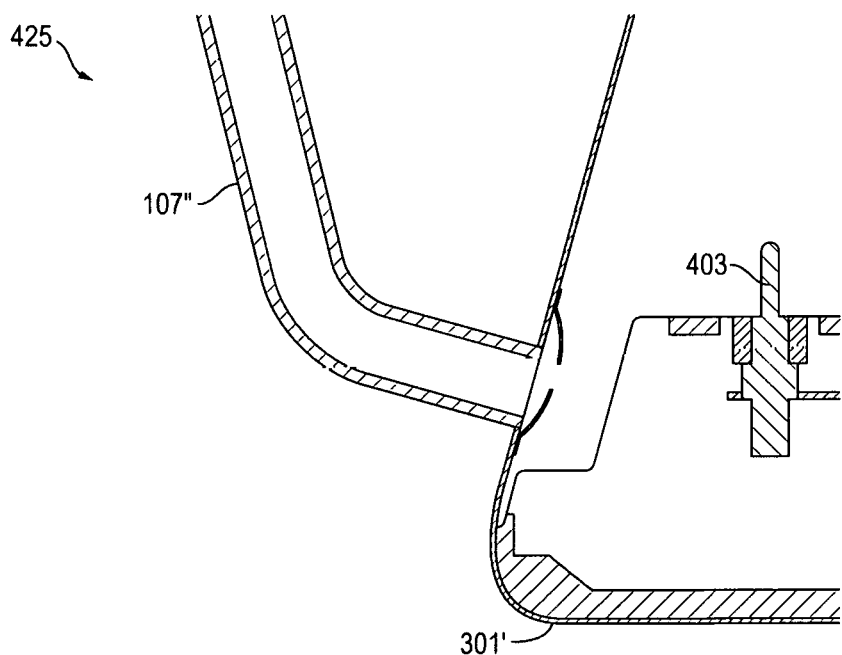

FIGS. 4A-B shows a cross-sectional views 400 and 425 of a dispensing kettle 101", such as the dispensing kettle 101 and the dispensing kettle 101', described in detail above with reference to FIGS. 1 and 3. The dispensing kettle 101" includes a handle 109", and a pouring spout 107", such as the handle 109 or 109' and the pouring spout 107 or 107'. The dispensing kettle 101' also includes body 465, such as the body 102 (FIG. 1) for holding a steeping liquid therein. The handle 109" of the dispensing kettle 101" includes a counter-balance weight, or counter-weight 110 contained within the handle 109". The counter-balance weight, or counter-weight 110 moves the center of gravity of the dispensing kettle 101" towards the handle and allow for controlled pouring of the steeping liquid from the body 465 of the dispensing kettle 101″ through the pouring spout 107″. The counter-balance weight, or counter-weight 110 preferable represents 25% or more of the total weight of the dispensing kettle 101″ and can represent as much as 50% of the weight of the dispensing kettle.

The dispensing kettle 101″ also includes a bottom surface 301′, such as the bottom surface 301 (FIG. 3) that includes a female coupling structure 303′ such as the female coupling structure 303 (FIG. 3). The female coupling structure 303′ is in electrical communication with the heating element 401 within the body 465 of the dispensing kettle 101″.

The dispensing kettle 101″ also includes a removable top 111′, such as the removable top 111 (FIG. 1). The removable top 111′ includes a thermometer structure 409. The thermometer structure 409 is an analog thermometer structure or digital thermometer structure and displays the temperature of the steeping liquid within the body 465 of the dispensing kettle 101″ regardless of weather the dispensing kettle 101″ is seated on or docked to the control station 103 (FIG. 1) or the control station 103′ (FIGS. 2A-B). As described above, the dispensing kettle 101″ also includes a thermocouple structure 403 that is also in electrical communication with the control station 103 or 103′ through the female coupling structure 303′ when the dispensing kettle is seated on or docked to the control station 103 or 103′ through the male coupling structure 201 (FIGS. 2A-B). The thermocouple structure 403 provides continuous temperature measurements to the PID controller or control loop feedback loop 105 (FIG. 1) and PID controller or control loop feedback loop 105 then continuously modulates power to the heating element 401 to heat the steeping liquid within the body 465 of the dispensing kettle 101″ to reach and/or maintain the selected temperature or target temperature.

Figure 5:
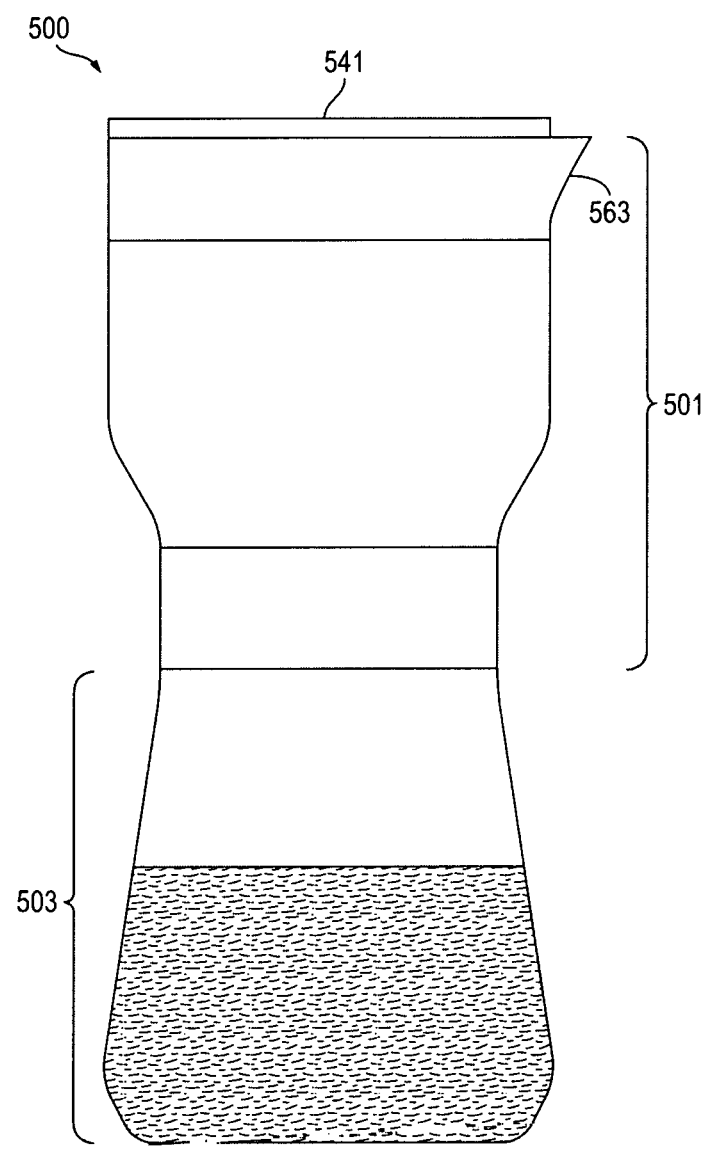
FIG. 5 shows an example of a pour-over steeping and dispensing system used to make a pour over beverage from steeping liquid prepared with an electric dispensing kettle system of the present invention.

FIG. 5 shows a view of a pour-over steeping and dispensing system 500 that can include a pour over filter unit 501 with a pouring lip 563 and cap 541. The pour-over steeping and dispensing system 500 can also include a capturing vessel 503 from collecting a pour-over liquid. In operation a steeping liquid is prepared using the electric dispensing kettle system of the present invention. A steeping liquid is prepared by heating the steeping liquid to selected temperature of target temperature using a dispensing kettle 101 (FIG. 1), 101′ (FIG. 3) or 101″ (FIG. 4A) coupled to or docked onto a control station 103 (FIG. 1) and 103′ (FIGS. 2A-B), as described above. When the steeping liquid has reached the selected temperature or target temperature, a user can depress the temperature dial knob 211 (FIG. 2B), as indicate by the arrow 203, and the electronic display 209 will set and display a timer to indicate the passage of time. The passage of time indicated on the electronic display 209 can then be used to monitor steeping times and pour-over times that are used to make a pour-over beverage with the pour-over steeping and dispensing system 500.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. An electric dispensing kettle system comprising:
   a) a dispensing kettle with a body, a handle, a pouring spout and a coupling structure on a bottom surface that is electrically coupled to a heating element within the body of the dispensing kettle;
   b) a control station with a matched coupling member that electrically couples to the heating element through the coupling structure when the kettle is seated on or docket to the electric control station and that provides controlled power to the heating element to heat a steeping liquid within the body of the dispensing kettle: and
   c) a PID controller or control loop feedback circuit that continuously modulates power from the control station to the heating element to heat the steeping liquid to a selected temperature or target temperature and to maintain the steeping liquid at the selected temperature or the target temperature wherein the kettle further comprises a counter-balance weight within the handle that weighs 25% or more of the total weight of the dispensing kettle.

2. The electric dispensing kettle system of claim 1, wherein the control station further comprising an electric display that simultaneously displays an actual temperature of the steeping liquid within the body of the displaying kettle and the selected or target temperature of the steeping liquid.

3. The electric dispensing kettle system of claim 2, further comprising a temperature dial knob for adjusting the selected temperature or the target temperature.

4. The electric dispensing kettle system of claim 3, further comprising a thermocouple structure that continuously measures the actual temperature of the steeping liquid within the body of the dispensing kettle and is electrical communication with the PID controller or control loop feedback circuit through the coupling structure on the bottom surface of the dispensing kettle and the matched coupling member on the control station.

5. An electric dispensing kettle system comprising:
   a) a dispensing kettle with a body, a handle, a pouring spout and an coupling structure electrically coupled to a heating element within the body of the dispensing kettle;
   b) a control station with a matched coupling structure that electrically couples to the heating element through the coupling structure when the kettle is seated on or docked to the control station and that provides controlled power to the heating element to heat a steeping liquid with the body of the dispensing kettle to a selected temperature or target temperature and to maintain the steeping liquid at the selected temperature or target temperature, the control station further comprising an electric display that simultaneously displays an actual temperature of the steeping liquid within the body of the dispensing kettle and the selected temperature or the target temperature and indicates a passage of time after the selected temperature or the target temperature is reached: and
   c) a counter-weight within the handle of the dispensing kettle that weighs 25% or more of the total weight of the dispensing kettle.

6. The electric dispensing kettle system of claim 5, further comprising PID controller or control loop feedback circuit that continuously modulates power from the control station to the heating element to heat the steeping liquid to the selected temperature or the target temperature and to maintain the steeping liquid at the selected temperature or the target temperature.

7. The electric dispensing kettle system of claim 6, further comprising a thermocouple structure that continuously measures the actual temperature of the stepping liquid within the body of the dispensing kettle and is electrical communication with the PID controller or control loop feedback circuit through the coupling structure and the matched coupling structure.

8. The electric dispensing kettle system of claim 5, further comprising a temperature dial knob for adjusting the selected temperature or the target temperature.

9. An electric dispensing kettle system comprising:
   a) a dispensing kettle with a body, a handle, a pouring spout and an coupling structure electrically coupled to a heating element within the body of the dispensing kettle, the dispensing kettle having a total weight;
   b) a control station with a matched coupling structure that electrically couples to the heating element through the coupling structure when the kettle is seated on or docked to the electric control station and that provides controlled power to the heating element to heat a steeping liquid with the body of the dispensing kettle to a selected temperature or target temperature and to maintain the steeping liquid at the selected temperature or the target temperature and a display that indicates a passage of time after the selected temperature or the target temperature is reached; and
   c) a counter-weight of within the handle of the dispensing kettle weighing 25% or more of the total weight of the dispensing kettle.

10. The electric dispensing kettle system of claim 9, further comprising PID controller or control loop feedback circuit that continuously modulates power from the control station to the heating element to heat the steeping liquid to the selected temperature or the target temperature and to maintain the steeping liquid at the selected temperature or the target temperature.

11. The electric dispensing kettle system of claim 9, wherein the control station further comprising an electric display that simultaneously displays an actual temperature of the steeping liquid within the body of the displaying kettle and the selected or target temperature of the steeping liquid within the body of the dispensing kettle.

12. The electric dispensing kettle system of claim 11, wherein the control station further comprising a temperature dial knob for adjusting the selected temperature or target temperature.

13. The electric dispensing kettle system of claim 11, further comprising a thermocouple structure that continuously measures the actual temperature of the stepping liquid within the body of the dispensing kettle and is electrical communication with the PID controller or control loop feedback circuit through the coupling structure on the bottom surface of the dispensing kettle and the matched coupling structure on the electric control station.

* * * * *